J. W. CUTLER.
PHOTOGRAPHIC ROLL HOLDER.
APPLICATION FILED SEPT. 12 1913.

1,144,934.

Patented June 29, 1915.
2 SHEETS—SHEET 1.

Inventor
Joseph Warren Cutler

Witnesses
Walter B. Payne
Russell Griffith

By Church Rich
his Attorneys

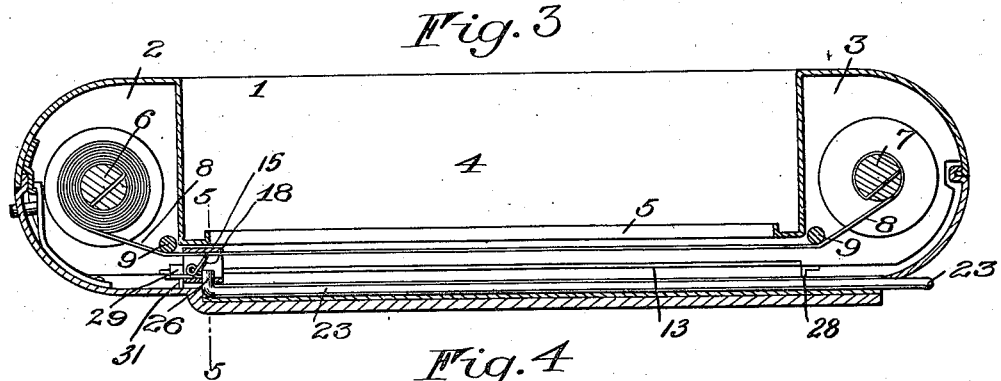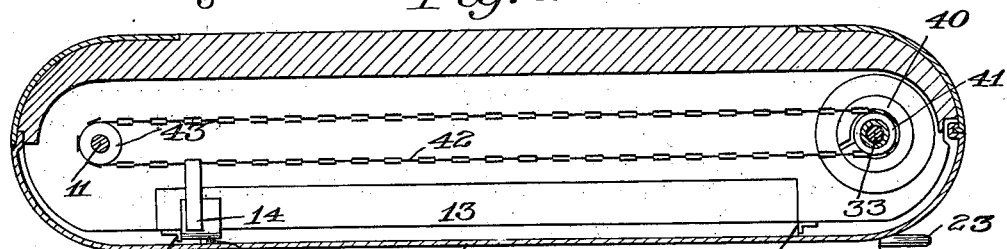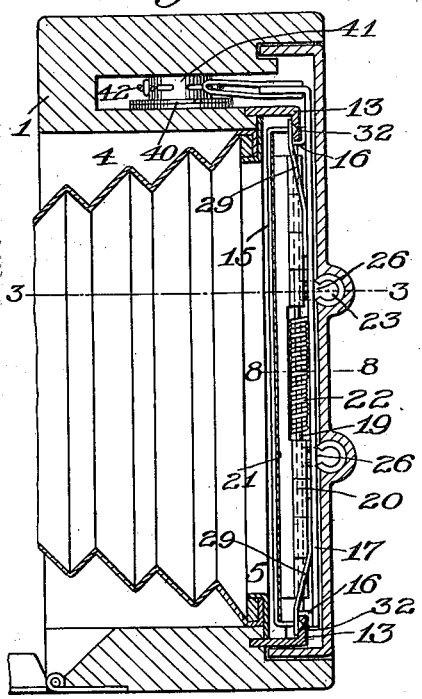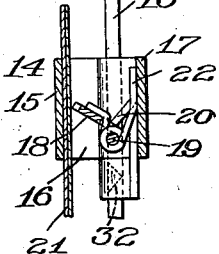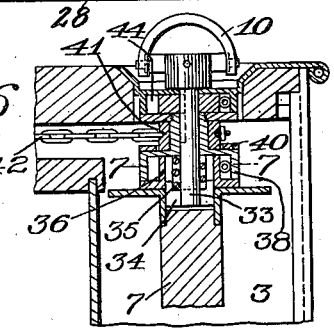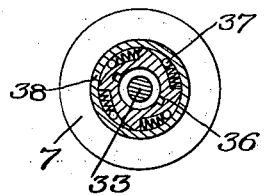

UNITED STATES PATENT OFFICE.

JOSEPH WARREN CUTLER, OF ROCHESTER, NEW YORK.

PHOTOGRAPHIC-ROLL HOLDER.

1,144,934.　　　　　　　Specification of Letters Patent.　　Patented June 29, 1915.

Application filed September 12, 1913. Serial No. 789,475.

*To all whom it may concern:*

Be it known that I, JOSEPH WARREN CUTLER, of the city of Rochester, in the county of Monroe and State of New York, have invented certain new and useful Improvements in Photographic-Roll Holders; and I do hereby declare the following to be a full, clear, and exact description of the same, reference being had to the accompanying drawings, forming a part of this specification, and to the reference-numerals marked thereon.

My present invention relates to photography, more particularly to photographic cameras of the roll holding type and it has for its object to provide a neat, compact and efficient means for feeding the successive exposure areas of the film strip into and out of the field of exposure with the utmost rapidity and certainty, as distinguished from the customary manner of winding it with a key upon the receiving roll.

A further object of the invention is to adapt a mechanism for accomplishing these ends to cameras of a standard type, so that very little new designing is necessary in fitting cameras of accepted form with my improvements.

To these and other ends, the invention consists in certain improvements and combinations of parts all as will be more fully described, the novel feature being pointed out in the claims at the end of the specification.

Figure 1:
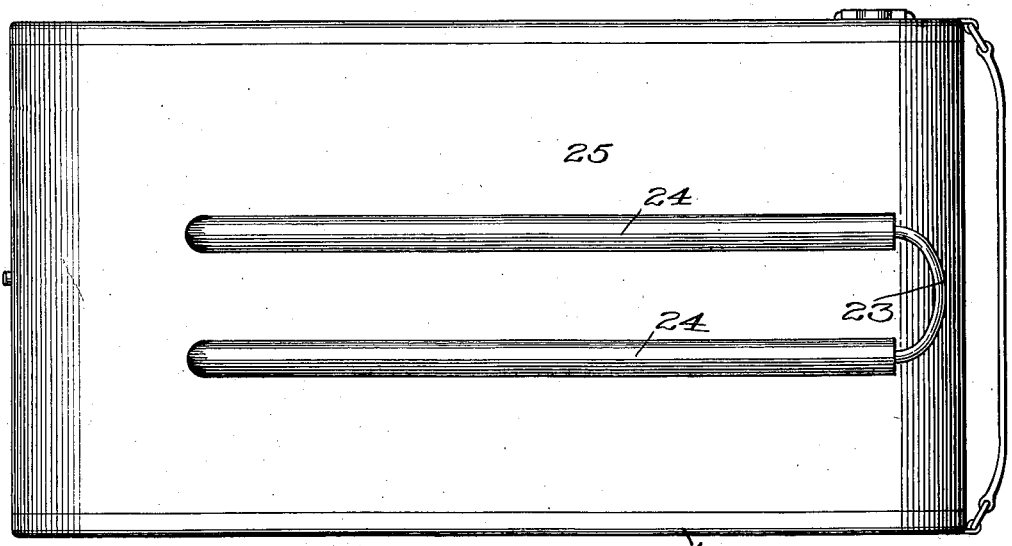
Figure 2:
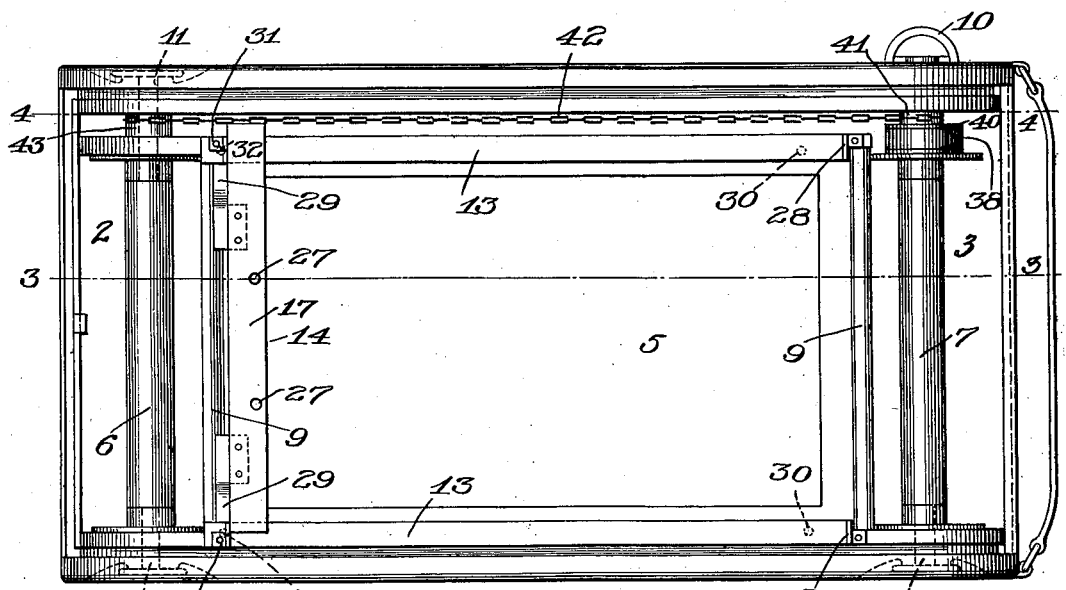

In the drawings: Figure 1 is a rear elevation of a roll holding camera constructed in accordance with and illustrating one embodiment of my invention; Fig. 2 is a similar view with the back removed; Fig. 3 is a horizontal section, taken substantially on the line 3—3 of Fig. 2; Fig. 4 is a horizontal section taken substantially on the line 4—4 of Fig. 2; Fig. 5 is a vertical section taken substantially on the line 5—5 of Fig. 3; Fig. 6 is an enlarged detail section of the driving mechanism for the take-up roll; Fig. 7 is a section taken substantially on the line 7—7 of Fig. 6, and Fig. 8 is a detail section through the gripper taken substantially on the line 8—8 of Fig. 5.

Similar reference numerals throughout the several figures, indicate the same parts.

A roll holder in connection with which I have illustrated my improvements in the present instance is incorporated in the structure of the camera itself, the latter being of what is known as the folding pocket type, comprising a casing 1, having rounded ends at which points are provided the film chambers 2 and 3, arranged at either side of the central bellows chamber 4, in rear of which is the exposure opening 5, that approximately defines the focal plane of the apparatus. Not all of the structure of the camera proper is shown, as this is deemed to be unnecessary for the relation of the missing part will be readily recognized by those skilled in the art.

The film chamber 2 is occupied by the usual supply spool or reel 6, and the chamber 3, by a similar take-up reel 7. The film strip 8 is fed from the former to the latter over rollers 9 and past the exposure opening by the mechanism hereinafter described, but arrangements may be made as illustrated for feeding the film by winding the receiving or take-up spool through the medium of a key 10 in much the usual manner, the supply roll 6 being journaled on centers 11 that may be projected or retracted to engage or release the spool, while one end of the take-up spool 7 is similarly supported on a center 12 and upon the key 10 before mentioned as will be later described in detail.

At opposite sides of the exposure opening 5 and running the length thereof, are guide flanges 13 on which reciprocates the gripper indicated generally by 14. This gripper (referring more particularly to Figs. 2 and 5) is yoke-shaped to span the entire width of the film track and is preferably composed of a lower plate 15, having its ends bent to engage both sides of the guide flanges 13, as at 16 and an upper plate 17 secured thereto and projecting at its ends beyond the guide for purposes that will later appear. The under plate 15 constitutes a fixed film gripping jaw and working in opposition to or against the same is a movable film gripping jaw 18 (Fig. 8) pivoted at 19 on a knuckle plate 20, carried in the present instance, by the upper plate 17. The engaging edge or face of the movable jaw 18 is preferably serrated as shown, to enable it to positively grip the surface of the portion 21 of the film that extends from one spool to the other and between the jaws, and this jaw is also preferably inclined slightly, as shown, in the direction in which it is moved in feeding the film toward the take-up spool to insure its firm engagement in addition to the provision of a spring 22 wound about the pivot 19. This spring, however, has insufficient tension to prevent the film from slipping between the jaws of the gripper in the opposite direction. Thus when the gripper is pulled forwardly or in the direction of the take-up spool 7, which is the direction of feed, the film is gripped and carried with it, but when it is returned in the opposite direction it slides freely over the film, which latter remains stationary.

The gripper is reciprocated in the present instance by an operating member, consisting of a wire yoke 23, that is accessible from the exterior of the casing and is carried in slotted guides 24 on a removable wall 25 of the latter, which in the present instance, is the back of the camera and is detachably connected thereto in the usual or any preferred manner, and it might be hinged thereto. The ends of the yoke 23 are turned inwardly as at 26 and detachably engage apertures 27 in the gripper 14. Thus when the back 25 is removed, the operating member 23 goes with it and when it is replaced, the operating member reëngages with the gripping device.

It will be seen from the foregoing description that in order to feed an exposure area of the film from the supply spool 6, to a position across the exposure opening 5, that it is only necessary to pull out the operating member 23 laterally of the casing with the parts in the position of Figs. 1 and 2, whereupon the gripper 14 being in engagement with the film, when traveling in this direction, will carry the latter along with it until it has crossed the exposure opening. Its limit of movement in this direction is determined by the abutments 28 at the ends of the guides 13 and it is centered and yieldingly maintained in this position by the engagement of yielding spring catches 29 on the gripper, having conical points that engage in apertures or depressions 30 in the tracks. The gripper is then returned to its former position by thrusting the operating member 23 inwardly, in which position it is similarly maintained by abutments 31 and depressions 32, which latter, when engaged by the spring catches, are useful in holding the gripper in its normal position, when threading the film therethrough in the first instance. The gripper slides freely over the film on the return trip, because of the construction before explained and because of devices that prevent the unwinding of the film from the take-up spool 7, as will later be described.

Of course, it is necessary to provide for automatically winding up the preceding portion of the film on the take-up roll 7 while the new exposure area is being drawn from the supply spool 6 by the gripper and I prefer to put this mechanism directly under the control of the gripper itself. Referring more particularly to Figs. 6 and 7, the stem 33 of the winding key 10 may be of substantially the usual construction with a cross piece 34 at its inner end, normally held in engagement with the slotted end of the spool by a spring 35, against the tension of which the stem is retracted to remove the spool. A hub 36 which surrounds the stem and is carried thereby, being journaled in the wall of the casing, has a familiar form of ball clutch connection as indicated at 37 in Fig. 7 with a driving element 38 surrounding it. This driving element 38 is in turn frictionally engaged under the tension of a spring flange 40 by a clutch element 41, which encircles it, and over a pulley portion on the clutch, runs an endless chain belt 42, having an idler 43 that may be conveniently mounted on the stem of the center 11 for the supply spool 6.

The ends of the upper plate of the gripper 14 are turned downwardly and suitably connected to the belt 42 in a fixed manner, so that during the feeding of the film, the clutch element 41 is rotated in a winding direction and through it the driving element 38. Of course, the movement imparted to the belt 42 by the gripper is always the same, whereas the number of rotations of the spool 7 that are required to winding up a given length of film varies according to the diameter of the roll of film that has already been wound, but the frictional nature of the drive between the clutch element 41 and the driving element 38 compensates for this, the drag of the film overcoming the frictional locking of the two parts and allowing the clutch element to run ahead, if necessary. When the gripper is returned to its initial position, the clutch element 41 rotates idly inasmuch as the ball clutch device 37 then locks the driving element 38 to the hub 36 against relative movement in that direction and the hub 36 in turn is held against reverse winding as usual by a ball clutch of the same kind arranged at 44 between it and the socket in the casing in which it is journaled. Therefore there is no tendency to unwind the film that has been taken up and it will be seen from the above description that the key 10 may be used independently of the automatic driving means in the usual way.

With a film feeding device constructed in accordance with my invention, successive exposure areas on a continuous strip may be almost instantaneously drawn into position for exposure by quickly drawing out the operating member 23 and returning it with the result that a number of exposures may be made, one after the other, in rapid succession, without the usual slow and laborious winding of the film key and the accompanying danger of unwinding that is more particularly present when the operator is in a hurry to make the next exposure on account of the changing nature of his subject or for other reasons. It is not necessary with my device to watch carefully for the appearance of the distinguishing mark on the film backing which it is often difficult to discern through the ruby window, particularly for people whose eyesight is not good.

I claim as my invention:

1. In a photographic roll holder, the combination with a casing having an exposure opening and film supply and take up devices arranged therein to stretch the film in rear of said opening, of means operable from the exterior of the casing arranged in rear of the film and opening and adapted to directly engage the film strip to move it from one to the other of said devices.

2. In a photographic roll holder, the combination with film supply and take up devices, of a reciprocatory gripper adapted to engage and move the film across the focal plane when the gripper is actuated in one direction and to release the film when actuated in the other direction and driving means between the gripper and the take-up device for driving the latter directly from the gripper.

3. In a photographic roll holder, the combination with film supply and take up devices upon which the film is wound and rolled, of a reciprocatory gripper comprising relatively movable jaws adapted to engage and move the film across the focal plane from one to the other of said devices when the gripper is actuated in one direction and to release the film when actuated in the other direction, the length of a single reciprocation of the gripper being approximately equal to the length of a single exposure area of the film whereby an entire exposure area may be advanced into exposing position by a single movement of the gripper driving means between the gripper and the take-up device for driving the latter directly from the gripper and compensating means associated with the driving means to allow for the increasing size of the roll on the take-up device.

4. In a photographic roll holder, the combination with a casing having a removable wall and film feeding and take up devices arranged in the casing, of means adapted to engage the film strip and to move it from one to the other of said devices and an operating member for said means detachably connected thereto and carried by the removable wall.

5. In a photographic roll holder, the combination with a casing having a removable wall and film feeding and take up devices arranged in the casing, of a reciprocating gripper adapted to engage the film and to move it from one to the other of said devices, and a reciprocatory operating member for the gripper guided on the removable wall and detachably connected to the gripper.

6. In a photographic roll holder, the combination with a casing having a removable wall and film feeding and take up devices arranged in the casing, of a reciprocatory gripper adapted to engage the film and to move it from one to the other of said devices, a reciprocatory operating member for the gripper guided on the removable wall and detachably connected to the gripper, and a centering device for the latter adapted to maintain it in a normal position for coöperation with the operating member when the latter is similarly positioned and the removable wall applied to the casing.

7. In a photographic roll holder, the combination with a film supply reel and a take up reel, of a gripper comprising relatively movable jaws adapted to engage and move the film from one to the other of said reels and means actuated by the gripper for rotating one of the reels.

8. In a photographic roll holder, the combination with a film supply reel, and a take up reel, of a gripper comprising relatively movable jaws adapted to engage and move the film from one to the other of said reels and means actuated coincidently with the movement of the gripper for rotating the take up reel.

9. In a photographic roll holder, the combination with a film supply reel and a take up reel, of a gripper comprising relatively movable jaws adapted to engage the intermediate stretch of film and feed it from one to the other of said reels and means for automatically rotating the take up reel during the feeding operation.

10. In a photographic roll holder, the combination with a film supply reel and a take up reel, of a gripper comprising relatively movable jaws adapted to engage and move the film from one to the other of said reels, a frictional driving element for the take up reel, the driving effect of which is adapted to be overcome by the resisting tension of the film and an actuating connection between the driving element and the gripper.

11. In a photographic roll holder, the combination with a film supply reel and a take up reel, of a reciprocatory gripper adapted to engage and move the film from one to the other of said reels, a driving element coöperating with the take up reel, a friction clutch element adapted to actuate the driving element in the winding direction and to run idly in the opposite direction and a belt connecting the gripper with the clutch element.

JOSEPH WARREN CUTLER.

Witnesses:
GEORGE A. BRIDGMAN,
ROSE E. GRAEUB.